United States Patent
Caban Babilonia

(10) Patent No.: US 12,362,789 B2
(45) Date of Patent: Jul. 15, 2025

(54) WIRELESS NETWORK FOR OBJECT AND PATTERN DETECTION

(71) Applicant: Red Hat, Inc., Raleigh, NC (US)

(72) Inventor: William J. Caban Babilonia, Columbia, MD (US)

(73) Assignee: Red Hat, Inc., Raleigh, NC (US)

(*) Notice: Subject to any disclaimer, the term of this patent is extended or adjusted under 35 U.S.C. 154(b) by 357 days.

(21) Appl. No.: 18/145,579

(22) Filed: Dec. 22, 2022

(65) Prior Publication Data

US 2024/0214038 A1    Jun. 27, 2024

(51) Int. Cl.
   *H04B 7/0426*   (2017.01)
   *H04B 7/08*     (2006.01)

(52) U.S. Cl.
   CPC ............ *H04B 7/043* (2013.01); *H04B 7/086* (2013.01)

(58) Field of Classification Search
   CPC . H04B 7/043; H04B 7/08; H04B 7/02; H04B 7/04; H04B 7/0413; H04B 7/0426; H04B 7/0408; H04B 7/022; H04B 7/024; H04B 7/0837; H04B 7/0842; H04B 7/086; H04B 7/0862; H04B 7/06; H04B 7/0602; H04B 7/0686; H04B 7/0695; H04B 7/06952; H04B 7/06964
   See application file for complete search history.

(56) References Cited

U.S. PATENT DOCUMENTS

| | | | | |
|---|---|---|---|---|
| 5,680,142 A * | 10/1997 | Smith | ...................... | H04B 7/086 342/372 |
| 9,608,793 B2 * | 3/2017 | Berntsen | .................. | H04B 7/10 |
| 10,164,799 B2 * | 12/2018 | Yi | ........................ | H04L 25/0224 |
| 10,277,370 B2 * | 4/2019 | Moshfeghi | ........... | H04B 7/0689 |
| 10,812,125 B1 * | 10/2020 | Badic | .................. | H04W 72/542 |
| 11,063,354 B2 * | 7/2021 | Jan | ......................... | H01Q 21/24 |

(Continued)

FOREIGN PATENT DOCUMENTS

KR    10-2022-0078142 A    6/2022

OTHER PUBLICATIONS

Barneto, et al., "Millimeter-wave Mobile Sensing and Environment Mapping: Models, Algorithms and Validation," arXiv:2102.11593v3 [eess.SP] Jan. 19, 2022, 16 pages.

(Continued)

*Primary Examiner* — James M Perez
(74) *Attorney, Agent, or Firm* — Womble Bond Dickinson (US) LLP

(57) ABSTRACT

Systems and methods for detecting objects and motion using wireless networks can include determining beamforming control parameters for one or more transceivers, transmitting, by a processing device, the beamforming control parameters to the one or more transceivers, and receiving, from one or more of the transceivers, data representative of detected radio frequency reflection signals. They can also include determining, based on the aggregated data, whether an object detection criterion is satisfied within a target spatial area, and responsive to the determination that the object detection criterion is satisfied, transmitting a notification reflective of the satisfaction of the object detection criterion. They can further include adjusting, based on the data, the beamforming control parameters, and transmitting adjusted beamforming control parameters to one or more transceivers of the plurality of transceivers.

20 Claims, 7 Drawing Sheets

(56) References Cited

U.S. PATENT DOCUMENTS

| | | | | |
|---|---|---|---|---|
| 11,271,699 | B1* | 3/2022 | Eyuboglu | H04L 1/1819 |
| 11,320,517 | B2* | 5/2022 | Rimini | G01S 7/411 |
| 11,336,319 | B2* | 5/2022 | Badic | H04W 72/51 |
| 11,474,197 | B2* | 10/2022 | Bayesteh | G01S 7/006 |
| 11,483,041 | B2* | 10/2022 | Alidio | H01P 1/18 |
| 11,528,657 | B1* | 12/2022 | Mangalvedhe | H04W 74/0833 |
| 11,784,693 | B1* | 10/2023 | Imanilov | H04B 7/043 375/252 |
| 11,796,669 | B2* | 10/2023 | Lee | H04B 7/0682 |
| 11,843,953 | B1* | 12/2023 | Montalvo | H04W 72/0453 |
| 11,892,555 | B2* | 2/2024 | Bayesteh | H04L 5/14 |
| 11,979,350 | B1* | 5/2024 | Eyuboglu | H04B 7/0874 |
| 12,166,639 | B2* | 12/2024 | Caban Babilonia | H04L 41/0833 |
| 2006/0208924 | A1* | 9/2006 | Matalon | G08G 1/017 340/572.1 |
| 2006/0232467 | A1* | 10/2006 | Small | G01S 5/0218 342/357.63 |
| 2012/0092217 | A1* | 4/2012 | Hosoya | H04B 7/086 342/373 |
| 2012/0220238 | A1* | 8/2012 | Hosoya | H04B 7/06 455/63.4 |
| 2012/0220239 | A1* | 8/2012 | Hosoya | H04B 7/0695 455/63.4 |
| 2013/0169471 | A1* | 7/2013 | Lynch | G01S 7/352 342/107 |
| 2013/0285853 | A1* | 10/2013 | Lee | H04W 24/08 342/368 |
| 2014/0086191 | A1* | 3/2014 | Berntsen | H04B 7/10 370/329 |
| 2014/0295909 | A1* | 10/2014 | Ouchi | H04W 52/245 455/522 |
| 2015/0070207 | A1* | 3/2015 | Millar | G01S 13/4454 342/174 |
| 2016/0020817 | A1* | 1/2016 | Chen | H04B 17/12 370/278 |
| 2017/0040704 | A1* | 2/2017 | Broyde | H03H 7/40 |
| 2018/0323834 | A1* | 11/2018 | Jiang | G01S 3/42 |
| 2018/0367203 | A1* | 12/2018 | Nilsson | H04B 7/0617 |
| 2019/0020401 | A1* | 1/2019 | Gharavi | H04B 17/318 |
| 2019/0140753 | A1* | 5/2019 | Katabi | H04B 17/309 |
| 2019/0150003 | A1* | 5/2019 | He | H04B 7/0617 342/368 |
| 2019/0215842 | A1* | 7/2019 | Silverman | H04W 72/542 |
| 2019/0327629 | A1* | 10/2019 | Zhang | H04B 7/0628 |
| 2019/0373485 | A1* | 12/2019 | Kato | H04L 5/0048 |
| 2019/0383898 | A1* | 12/2019 | Alidio | G01S 13/865 |
| 2020/0022094 | A1* | 1/2020 | You | H04W 72/21 |
| 2020/0112347 | A1* | 4/2020 | Fukui | H04W 52/146 |
| 2020/0136234 | A1* | 4/2020 | Paulotto | H01Q 15/0026 |
| 2020/0284883 | A1* | 9/2020 | Ferreira | G01S 7/4815 |
| 2021/0055385 | A1* | 2/2021 | Rimini | G01S 7/417 |
| 2021/0135721 | A1* | 5/2021 | Lopez | H04B 5/45 |
| 2021/0175919 | A1* | 6/2021 | Badic | H04B 7/0408 |
| 2021/0286045 | A1* | 9/2021 | Bayesteh | H04B 7/0695 |
| 2021/0287547 | A1* | 9/2021 | Beauchamp | H04W 76/50 |
| 2022/0224380 | A1* | 7/2022 | Lee | G01S 13/426 |
| 2022/0229187 | A1* | 7/2022 | Chai | G01S 17/87 |
| 2022/0256519 | A1* | 8/2022 | Jeon | G01S 7/0235 |
| 2023/0083550 | A1* | 3/2023 | Sambhwani | G01S 7/003 342/146 |
| 2023/0112477 | A1* | 4/2023 | Bayesteh | G01S 7/006 342/60 |
| 2023/0246347 | A1* | 8/2023 | Enomoto | H01Q 21/08 343/702 |
| 2023/0308141 | A1* | 9/2023 | Wang | H04W 72/53 |
| 2023/0412432 | A1* | 12/2023 | Li | H04W 72/0453 |
| 2024/0137887 | A1* | 4/2024 | Jeong | H04W 56/0045 |
| 2024/0214038 | A1* | 6/2024 | Caban Babilonia | H04B 7/043 |
| 2024/0214921 | A1* | 6/2024 | Caban Babilonia | H04W 52/0203 |
| 2024/0280663 | A1* | 8/2024 | Bayesteh | G01S 7/006 |
| 2025/0015867 | A1* | 1/2025 | Prasad | H04B 7/06952 |

OTHER PUBLICATIONS

"mmWave Radar Sensor Arduino-Human Presence Detection Wiki—DFRobot, SKU:SEN0395 (https://www.dfrobot.com/product-2282.html)," DFRobot.com, https://wiki.dfrobot.com/mmWave_Radar_Human_Presence_Detection_SKU_SEN0395#top, Accessed Dec. 6, 2022, 16 pages.

Dufresne, Steven, Jul. 2, 2018, "Using an Air and Wifi to See Through Walls," Hackaday, https:// hackaday.com/2018/07/02/using-an-ai-and-wifi-st-see-through-walls/, 17 pages.

Fletcher, Bevin, Jun. 8, 2021, "UScellular, Nokia, Qualcomm stretch 5G mmWave 10 km in new record," Fierce Wireless, https://www.fiercewireless.com/operators/uscellular-nokia-qualcomm-stretch-5g-mmwave-10-km-new-record, 5 pages.

Guerneve, et al., "3D Reconstruction of Underwater objects using wide-aperature Imaging SONAR," https:// homepages.inf.ed.ac.uk/ksubr/Files/Papers/JoFR18.pdf, Accessed Dec. 6, 2022, 22 pages.

Iovescu, C. and Rao, S., "The fundamentals of millimeter wave radar sensors," Texas Instruments, Jul. 2020, 9 pages.

Joe, et al., "Probabilistic 3D Reconstruction Using Two Sonar Devices," Sensors, 2022, 22, 2094, 15 pages, https://doi.org/10.3390/s22062094.

Lin, Shaoshan, Mar. 4, 2019, "Passive Perception with Sonar and mmWave Radar," PerceptIn, https://www.perceptin.io/post/passive-perception-with-sonar-and-mmwave-radar, 12 pages.

"5G spectrum bands explained—low, mid and high band | Nokia," https://www.nokia.com/networks/insights/spectrum-bands-5g-world/, Accessed Dec. 6, 2022, 11 pages.

Rappaport, et al., "Wireless Communications and Applications Above 100 GHz: Opportunities and Challenges for 6G and Beyond," IEEEAccess, Digital Object Identifier 10.1109/ACCESS.2019.2921522, vol. 7, 2019, 78729-78757.

"What Is a RAN Intelligent Controller (RIC)?", Juniper Networks, https://www.juniper.net/us/en/research-topics/what-is-ic.html, Accessed Dec. 6, 2022, 5 pages.

Singh, A.K. and Kim, Y.H., "Analysis of Human Kinetics using Millimeter-wave Micro-Doppler Radar," 7th International conference on Intelligent Human Computer Interaction, IHCI 2015, Procedia Computer Science 84 (2016), 36-40, https://www.sciencedirect.com/science/article/pii/S1877050916300771.

"5G Spectrum," GSMA Public Policy Position, Jun. 2022, https://www.gsma.com/spectrum/wp-content/uploads/2022/06/5G-Spectrum-Positions.pdf, 12 pages.

Yoon, et al., "Efficient B-mode Ultrasound Image Reconstruction from Sub-sampled RF Data using Deep Learning," arXiv: 1712.066096v3 [cs.CV] Aug. 7, 2018, https://arxiv.org/pdf/1712.06096.pdf, 12 pages.

Zhou, et al., "Through-Wall Human Pose Estimation Using Radio Signals," Computer Vision and Pattern Recognition (CVPR), 2018, https://openaccess.thecvf.com/content_cvpr_2018/papers/Zhao_Through-Wall_Human_Pose_CVPR_2018_paper.pdf, pp. 7356-7365.

Xiong, et al., "Millimeter-Wave Bat for Mapping and Quantifying Micromotions in Full Field of View", Research, Aug. 16, 2021, vol. 2021, 9787484, 13 pages, https://doi.org/10.34133/2021/9787484.

Liu, et al., "Wavoice: A Noise-resistant Multi-modal Speech Recognition System Fusing mmWave and Audio Signals", Nov. 15, 2021.

"3D Connect 5G", Coda Octopus, 2022, https://www.codaoctopus.com/products/3d/3d-connect, Accessed Oct. 26, 2022, 5 pages.

* cited by examiner

WIRELESS NETWORK FOR OBJECT AND PATTERN DETECTION

TECHNICAL FIELD

The disclosure is generally related to network systems, and more particularly, to detecting objects and patterns with wireless network systems.

BACKGROUND

The use of wireless networks has continuously increased due to both an increase in the number and the types of devices that are used by users (i.e., user equipment (UE)) that utilize network resources. The increased adoption of this technology has also grown in parallel with the amount of data and bandwidth being used by various applications, such as video streaming, operating on these UEs and the networks and has also led to a higher density of network elements in various locations. Such networks often use millimeter wave (mmWave) radio frequency (RF) equipment and can include wireless networks operating under Institute of Electrical and Electronics Engineers (IEEE) 802 series of protocols, as well as the Third Generation Partnership Project (3GPP) Long Term Evolution (LTE) 5$^{th}$ generation (5G) networks and 6$^{th}$ generation (6G) networks, which can include both a radio-access network (RAN) and a core network (CN).

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
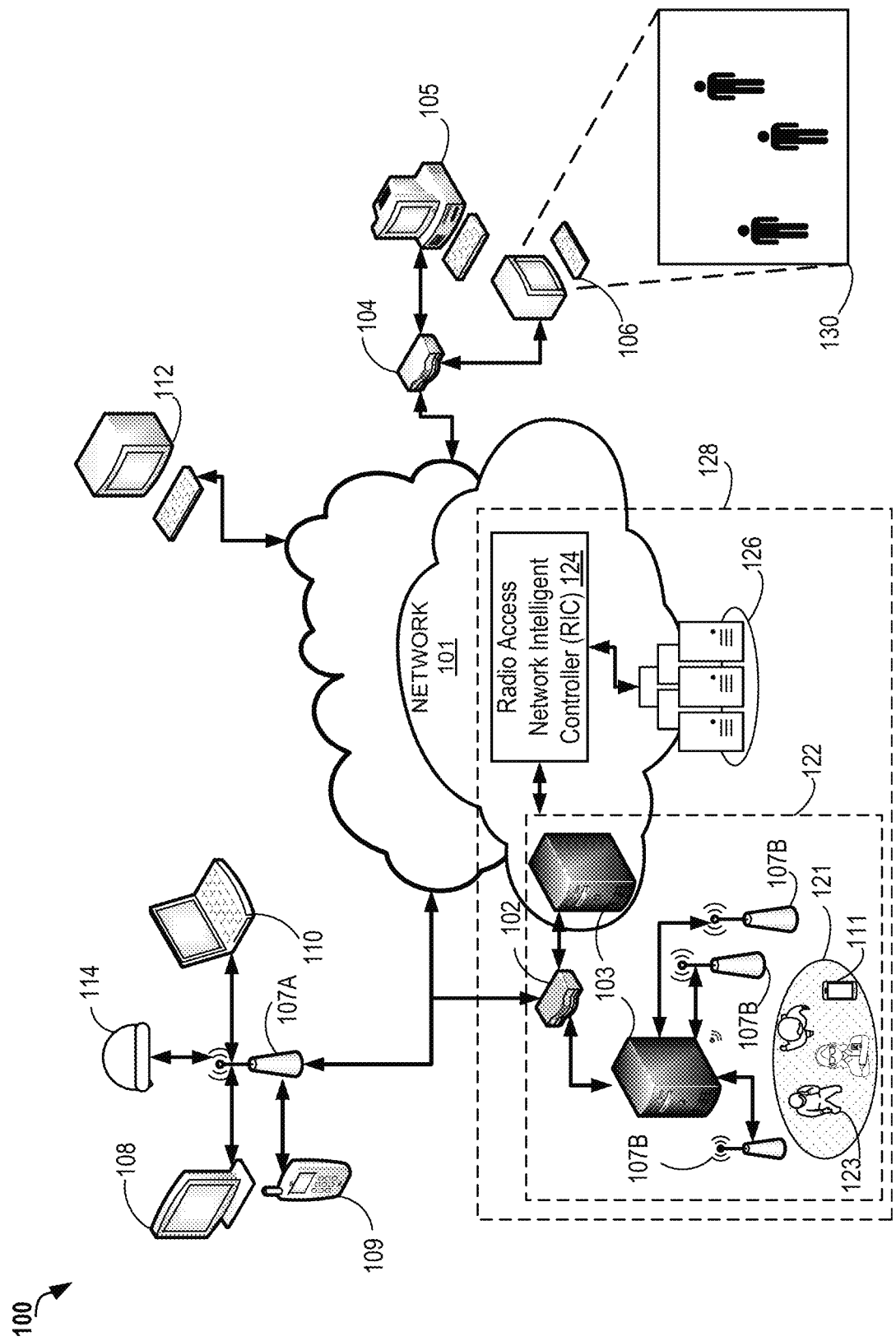
FIG. 1 depicts a block diagram of an example network architecture, in accordance with one or more implementations of the present disclosure.

Described herein are methods and systems for detecting objects and patterns with wireless network systems. The continued spread of millimeter wave (mmWave) radio frequency networks and user equipment (UE) devices has resulted significant amounts of interconnected collections of antennas that can perform other functions in addition to the communications that they execute. For example, as many UEs utilizing WiFi technology, cellular wireless technology, or both technologies, can connect to one or more base stations (BSs) or access points (APs) (each of a BS and an AP can also be referred to as a station in this disclosure) at the same time.

"BS" refers to a stationary device in a telecommunication network that is capable of wirelessly transmitting messages, receiving messages, or both transmitting and receiving messages. A BS can wirelessly connect a UE to other networks or devices that can be connected through dedicated high bandwidth wire or fiber optic connections. In the context of cellular networks base stations can refer to cell towers to which UEs using cellular technology can connect. In some systems, the capabilities of the BS can be selected to provide service based on factors such as the size of the service area to be covered, the number of UEs to be supported, as well as the local geography where the service is deployed.

For example, cell tower base stations can range from those that are implemented as large towers that cover a service area on the order of miles to those that are implemented as microcells in urban environments that only cover a few square city blocks of area. In Wi-Fi data networks, a UE can connect to a type of BS referred to as wireless access points (APs) which can send the Wi-Fi radio transmission to a wired network. "AP" refers to a device that has access to wireless capabilities and allows wirelessly transmitting, receiving, or both transmitting and receiving data between one or more other devices on a Wi-Fi network. An AP can be a Wi-Fi BS with a shorter range of operation than a cellular BS. Accordingly an AP can be a BS and each AP and BS can be referred to a station insofar as each of them provide wireless connectivity to UEs that are connected to them or provide connectivity between those UEs.

In some systems, where a UE can be connected to one or more stations, it is possible to determine the location of the UE and, consequently, the user of the UE. This information can be used to infer the presence of users in the location where the UE is detected. Consequently, some systems can extrapolate the detection of multiple UEs and their respective users to detect the presence of individuals or movements of objects (e.g., by triangulating the position of the UEs based on the length of time that signals take to reach three or more BSs). This information can be useful, for example, for estimating network usage or load in particular areas or tracking the presence and movement of people or objects in those areas.

However, to detect objects or movement, these approaches require the presence and use of UEs since they depend on the communication between the UEs and BSs. Furthermore, in many situations even if UEs are present, there may not be a sufficient number of BSs to accurately determine the location of such a UE. Additionally, in areas where the current or anticipated usage of wireless network resources is not accurately determined or estimated, the network operation can often experience undesirable network operation dynamics caused by either dedicating too few resources (e.g., activating too few BSs in a busy service area) or too many resources (e.g., activating too many BSs in an service area with few people) to adequately meet the requirements of its users. Accordingly, because of the lack or low granularity (i.e., imprecision) of information that is available regarding the location and movement of individuals (e.g., telecommunication service users) in target service areas, several challenges often arise including: (i) large amounts of energy and resources being wasted for maintaining services (i.e., keeping services active) in areas and at times where they may not be needed; (ii) in emergency situations, inaccurate determination of the presence of people in danger being, made leading to wasted emergency resources; and (iii) unauthorized individuals entering a target spatial area where conditions (i.e., visibility conditions, disabled security measures, etc.) prevent other means of detecting their presence from accurately detecting their movement or presence.

Aspects of the present disclosure address the above-noted and other deficiencies by providing mechanisms through which reflected radio frequency (RF) signals are used to detect the presence or movement of objects. RF signals can be reflected off animate and inanimate objects to infer information about the objects. At different frequencies this principle can be implemented at different corresponding ranges of distances for object and motion detection. Signals at frequencies used by WiFi (e.g., 2 GHz) and 5G (e.g., 20 GHz) networks can be used to detect objects and the movement of such objects at various distances. Accordingly, in the various systems, RF signals can be reflected off one or more objects and the reflections can be sensed to infer information about the object. At some frequencies this mechanism can be implemented as long-range radar while at other frequencies, such as those used by Wi-Fi systems, this mechanism can be utilized for short-range object detection.

Some implementations, such as those represented by FIG. 1 which depicts a block diagram of a network architecture 100 in which implementations of the disclosure may operate, can use a range of RF frequencies. Signals at various mmWave frequencies can be emitted and can have their reflections collected by elements of wireless networks to detect animate and inanimate objects within its area of operation or a particular target spatial area 121. Accordingly, the various implementations of the present disclosure utilize radio telecommunication networks to detect people and objects through mmWave signals.

More specifically, radio units (RUs) 107A, 107B can be used to detect reflections of transmitted radio signals to determine the presence or movement of people 123 or vehicles in a target spatial area 121. An RU 107A, 107B can refer to a logical node (e.g., a telecommunication device) in a radio access network (RAN) 122 that includes one or more transceivers including antennas and a set of processing capabilities. An RU 107A, 107B can transmit, receive, amplify, and digitize radio frequency signals. In various implementations, the RU can transmit data (e.g., digital data) to, receive data from, or both transmit data to and receive data from a distributed unit (DU) (e.g., computing device 103) or a RAN intelligent controller (RIC) 124 which are described in more below. The radio unit 107A, 107B can form radio frequency beams based on parameters provided by a DU or RIC 124. The RU 107A, 107B can refer to a logical node that is controlled by the DU to perform RF processing functions, or low-PHY layer functions such as performing a fast Fourier transform (FFT), an inverse FFT (iFFT), digital beamforming, physical random access channel (PRACH) extraction and filtering, as well as performing wired communication (e.g., ethernet) functions. In the various implementations, RUs can handle over the air (OTA) communication with one or more UEs 111 that can be connected to the respective RUs 107A, 107B. Furthermore, in some systems, the DUs can control the respective RUs 107A, 107B via a cloud-based RAN architecture, such as a virtual RAN (vRAN) architecture.

A RAN 122 can refer to a network that includes one or more communicably connected radio transceivers (e.g., RUs 107A, 107B) and one or more controllers (e.g., computing devices such as server 103, and RIC 124 described in more detail below) that manage the transceivers. The controllers that manage transceivers of the network can include computing devices such as servers 103 that have one or more processors and can also be implemented as distributed systems (i.e., controllers deployed across multiple computing devices in a cloud network such as the RIC 124) that perform the operations of managing the components (e.g., transceivers) of the network. In the various implementations, a RAN 122 can include multiple interconnected stations with RUs 107A, 107B having a variety of functionalities (e.g., base transceiver station (BTS), a radio base station 107B, a radio transceiver, a transceiver function, a basic service set (BSS), an extended service set (ESS), an access point (AP) 107A, a Node B (NB), an eNode B (eNB), a gNode B (gNB), a transmission and reception point (TRP)). Accordingly, these various elements of the RAN 122 such as the stations, RUs 107A, 107B, and other components can be managed by a type of controller referred to as a RAN intelligent controller (RIC).

The RIC 124 can refer to a physical or virtual processing node (e.g., a physical computing device or a virtual computing device executed on a distributed set of computing resources) capable of collecting information and controlling the operation of a RAN 122. Accordingly, in the various implementations, the RIC 124 can be implemented by a computing device such as a server 103 which is located in a particular physical place, or the RIC can be implemented through virtual computing on a collection of distributed computing resources. The RIC 124 can, in some systems, be connected to other components of the RAN 122 through an ethernet connection. Thus, the RIC 124 can communicate with one or more other computing device (e.g., distributed units described in more detail below) to collect information and manage the operation of the RUs 107A, 107B that are controlled by the DUs. In some implementations, the RIC 124 can perform fine grained data collection and execute artificial intelligence (AI) machine learning (ML) operations based on the collected data. For example, the RIC can include a logical function that enables control and optimization of RAN elements and resources, AI/ML workflows that include ML model training and updates, or policy-based guidance of applications and features of the RAN 122. In some implementations, the RIC 124 can control the operations of the RUs through the DUs that can be directly connected to the RUs 107A, 107B.

The DU can refer to a physical or virtual processing node (e.g., computing device, server 103, etc.) capable of performing Radio Link Control (RLC), Medium Access Control (MAC) functions, or a combination of such functions. In some implementations, the DU can directly control one or more RUs. For example, the DU can be a computing unit (e.g., a server 103 running a real-time kernel [i.e., with non-preemptive queuing for processes], GPS synchronization, etc.). The DU can refer to the computing device (e.g., server 103) that is directly connected to the RU (e.g., a collection of one or more antenna devices) 107A, 107B. In some implementations, each DU can control multiple RUs (e.g., 3, 5, 12 antenna devices) 107A, 107B. In the various implementations, some of the functionalities of a station (e.g., an eNB or a gNB station) can be split between a DU and the RUs 107A, 107B that it is controlling via one or more communication links. Thus, a station in a RAN 122 can include a DU as well as one or more co-located or geographically distributed RUs 107A, 107B. In the various implementations, the RAN can form a part of a multi-access edge computing (MEC) 128 network architecture that includes one or more sets of edge computing system (ECS) 126 resources.

An ECS 126 can refer to a system within a multi-access edge computing (MEC) 128 network architecture that provides cloud computing capabilities and service environment (e.g., through one or more ECSs 126 and other computing and processing devices) at the edge of a network. A function of a MEC 128 in various implementations is reducing latency as well as the maintenance of highly efficient network operation and service delivery. Edge computing can refer to computing that takes place at or near the physical location of either the user or the source (e.g., a UE 107A, 107B) of the data that is processed. In some implementations, the RIC 124 can be a part of the ECS 126 (e.g., computing resources of the RAN 122 in a MEC architecture 128) that is physically located near the area where the RAN 122 is deployed. For example, the ECS 126 can include the RIC 124 as a part of a collection of a large amount of computing resources (e.g., resources on which service applications can be deployed) that optimally operate in low latency conditions or are preferred to be located near to the infrastructure (e.g., RAN, antenna devices) or the UEs based on latency, bandwidth, jitter (i.e., variance of latency) optimization goals. In some implementations, the ECS 126 in a MEC 128 can include collections of graphics processing units (GPUs), processing resources (e.g., 120 processor cores), operational memory (e.g., 1 terabyte of random-access memory (RAM)), and inferencing hardware (e.g., an infrastructure processing unit (IPU)) designed to perform inferencing operations.

The exchange of information in the architecture 100 through the network 101 or other network can occur through one or more high speed connections. In some cases, high speed connections can be over-the-air (OTA), passed through networked systems, directly connected to one or more networks 101 or directed through one or more routers 102, 104. Router(s) 102, 104 can be included in some implementations of the present disclosure while other implementations may not utilize one or more routers 102, 104. There can be numerous ways the computing devices of architecture 100 can connect to the network 101 for the exchange of information, and various implementations are contemplated for use with any method for connecting to networks for the purpose of exchanging information. Further, while this disclosure refers to high speed connections, implementations of the invention can be utilized with connections of any speed.

Figure 6:
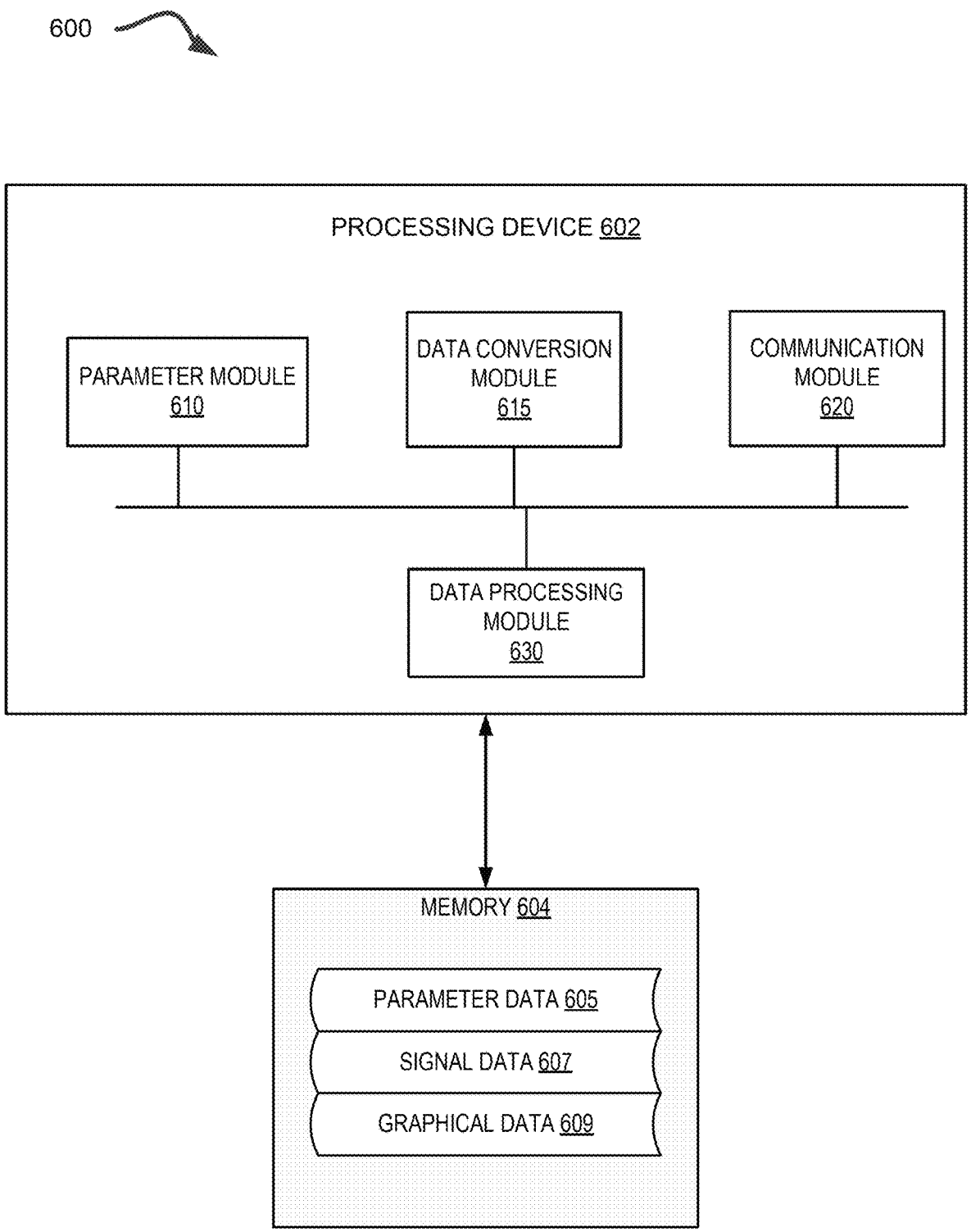
FIG. 6 depicts a block diagram of an example computer system in accordance with one or more implementations of the present disclosure.
Figure 7:
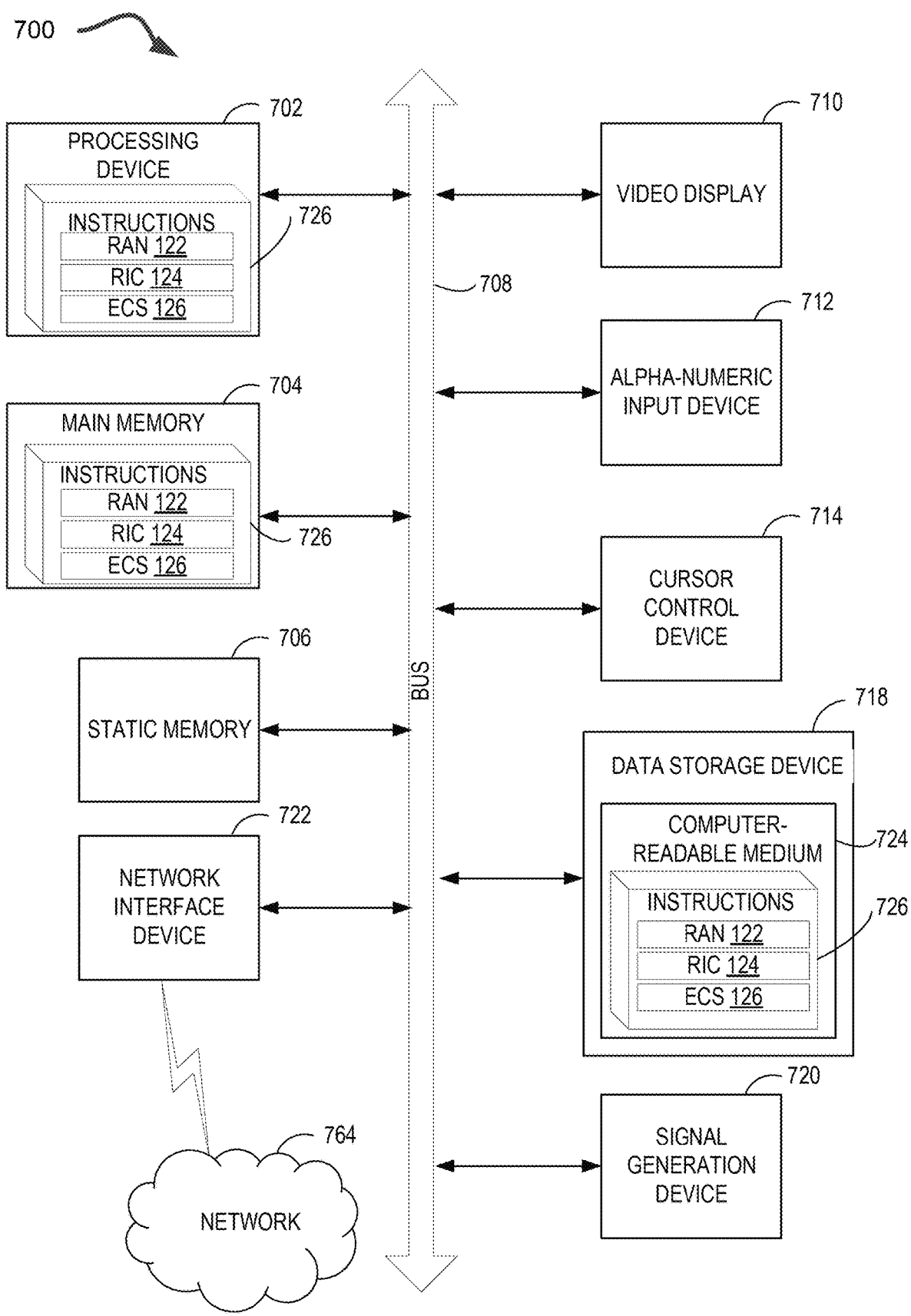
FIG. 7 depicts a block diagram of an illustrative computing device operating in accordance with the implementations of the disclosure.

Components, elements, or modules of the architecture 100 (which can correspond to one or more components, elements, or modules of systems 600 and 700 of FIGS. 6 and 7 respectively) can connect to server 103 via network 101 or other network in a variety of ways. For instance, a component or module can connect to the system (i) through a computing device 112 that can be directly connected to the network 101, (ii) through a computing device 105, 106 that can be connected to the network 101 through a routing device 104, (iii) through a computing device 108, 109, 110, 114 that can be connected to a wireless access point 107A, or (iv) through a computing device 111 via a wireless connection (e.g., Wi-Fi, CDMA, GMS, 3G, 4G, 5G, 6G etc.) to the network 101. There are numerous ways that a component or module can connect to server 103 via network 101 or other network, and implementations of the disclosure are contemplated for use with any method for connecting to server 103 via network 101 or other networks. Furthermore, server 213 could include a personal computing device, acting as a host for other computing devices to connect to.

In some implementations, input and output operations (e.g., receipt of user input, transmission of notification, generation of audiovisual representations, etc.) in the component systems can be realized via computing devices such as a laptop 110, personal computers 105, 106, 108, cellular phones 109, smart phone 111, smart speakers 114 etc. Each of the functions described herein can be performed via the input and output means of one or more of these respective devices including the transmission and detection of signals, collection of data, conversion and processing of the data, generation and transmission of notifications, modification of network operations, etc.

Thus, in some implementations, a radio access network (RAN) 122 deployed in a particular location can have multiple RUs 107B whose operative range covers a target location 121. The RUs 107B can be controlled by a DU (e.g., server 103) which can, in turn, be managed by a RIC 124. Through control parameters provided by the RIC 124, the DU can direct the RUs 107B to form beams that can be reflected and detected by the RUs 107B.

The control parameters can include settings, values, selections, and functions used to manage the operation of the RUs 107A, 107B in the RAN 122. In some implementations, these parameters can specify communication protocols, radio resources/network resource allocation (e.g., selecting a network resource, a MEC server, a MEC network, etc.), service selection (e.g., providing either video or audio services, changing latency requirements, etc.). In particular, in the various implementations, the control parameters can include signal parameters (e.g., frequency, intensity, duration, etc.) and waveform configurations, for forming radio frequency beams (beamforming) by the RUs 107B, 107A. For example, the control parameters can include settings for generating particular beamforms by an RU 107A, 107B and for receiving reflected signals (e.g., signals reflected off objects or people 123).

In some implementations, the RU 107A, 107B can sense the reflected signals and convert them for further transmission. For example, the detected signals can be converted to digital data that is collected by the DUs (e.g., servers 103) or RIC 124 to be processed by the ECS 126. The ECS 126 processing resources (e.g., edge computing resource) of the telecommunications network that includes the RAN 122, can process the collected data (e.g., through AI/ML operations) to perform a remedial action or to generate representations 130 of detected objects/motion (e.g., at a particular time), or movement patterns (over a period of time).

For example, in some implementations, the ECS 126 or the RIC 124 can transmit control parameters to one or more RUs 107A, 107B for beamforming. This transmission can occur directly to the RUs, or it can initially be transmitted to an intermediary device, such as the DU (e.g., server 103), which then, in turn, can pass the transmission on to one or more RUs 107B. Based on these initial control parameters, each of the RUs 107A, 107B that received them can generate and emit a corresponding RF beam. These RUs 107A, 107B can then detect and sense the reflected signal(s) (i.e., the reflections of the emitted RF beam) that return to the RUs 107A, 107B.

In some implementations, the RUs 107A, 107B can then convert the detected or the sensed reflected signals into digital form (e.g., a digital data stream) that can then be transmitted to other components. For example, in response to a request or automatically, the RUs 107A, 107B can transmit the digital data to the ECS 126 or the RIC 124 directly or by first transmitting it to the DU (e.g., server 103). In some implementations, the ECS 126 or the RIC 124 can receive from one or more of the RUs 107B, data that is representative of the detected echo signals (i.e., reflected RF signals). The RIC 124 or the ECS 126 can then aggregate the data and determine, based on it, whether a pre-determined criterion is satisfied.

In some implementations, the pre-determined criterion can specify a threshold number of objects or individuals to be detected. For example, if the number of detected people in the target spatial area exceeds a threshold value, then in such implementations, the object detection criterion can be deemed to be satisfied. In other implementations, the pre-determined criterion can specify a particular pattern of movement. For example, if the number of moving objects (e.g., vehicles) in the target spatial area exceeds a threshold value, then in such implementations, the object detection criterion can be deemed to be satisfied.

If the object detection criterion is satisfied, the RIC 124 or the ECS 126 can then take a remedial or responsive action. For example, in some implementations, the RIC 124 or the ECS 126 can generate and transmit, based on the received data and/or based on the determination, a notification to another computing or telecommunication device. In the same or other implementations, the RIC 124 or the ECS 126 can generate and transmit a graphical or three-dimensional representation of the detected objects or individuals within the target spatial area. As noted, the DU (e.g., server 103) can operate as an intermediary controller device between the RUs 107A, 107B and the RIC 124 or the ECS 126. For example, the DU can transmit control parameters to RU(s) for beamforming and then receive, from the RU(s), the converted data that represents the detected reflected signal(s). Further, in some implementations, either automatically or upon receiving a request (e.g., from an ECS application that uses the RIC 124), the DU can transmit the data (i.e., the data received from the RU(s)) to the ECS 126 or to the RIC 124.

In this manner, the various implementations can (a) identify the movement of people 123 within the target spatial area 121, identify a location of individuals 123 within the target spatial area 121, and/or (b) determine traffic patterns of people or vehicles to provide additional services and functionality based on that information. Such modification of RAN operation (e.g., increase or reduction of service provision) is described with additional reference to FIGS. 2A and 2B.

Figure 2A:
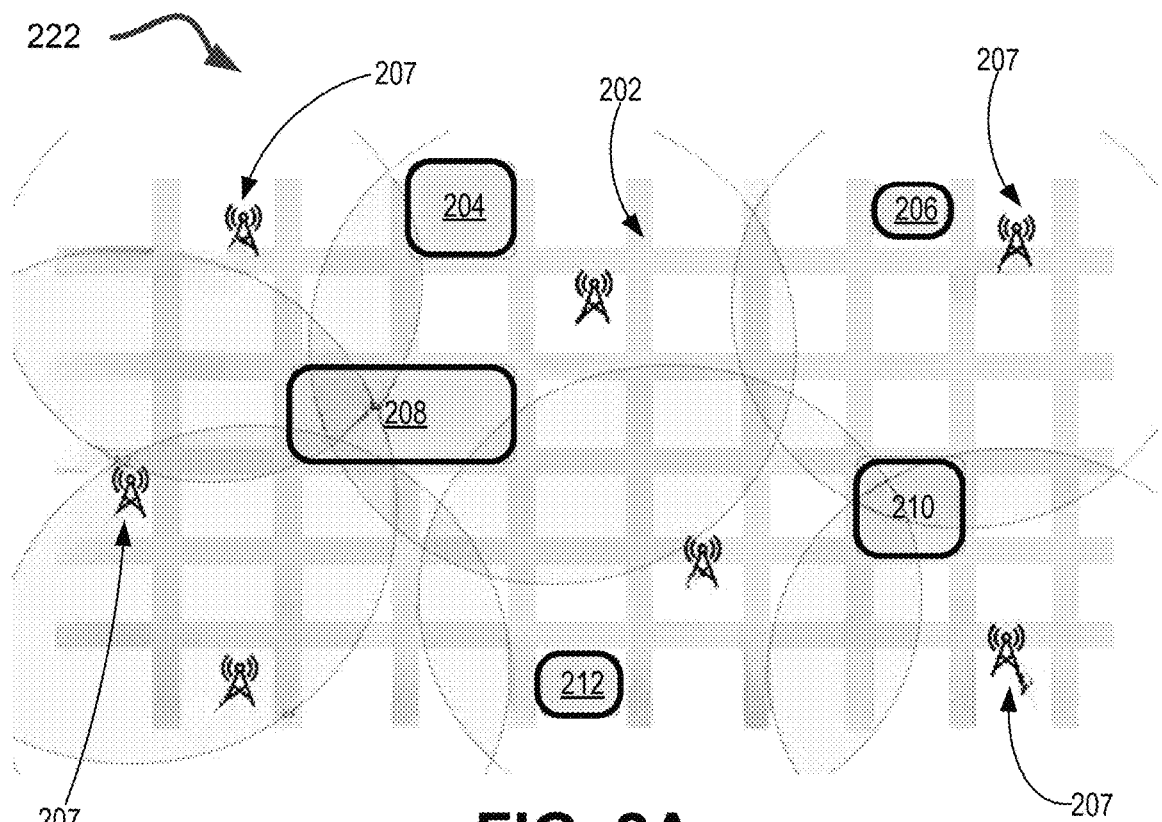
FIG. 2A depicts a schematic diagram of an operating area of a wireless network, in accordance with one or more implementations of the present disclosure
Figure 2B:
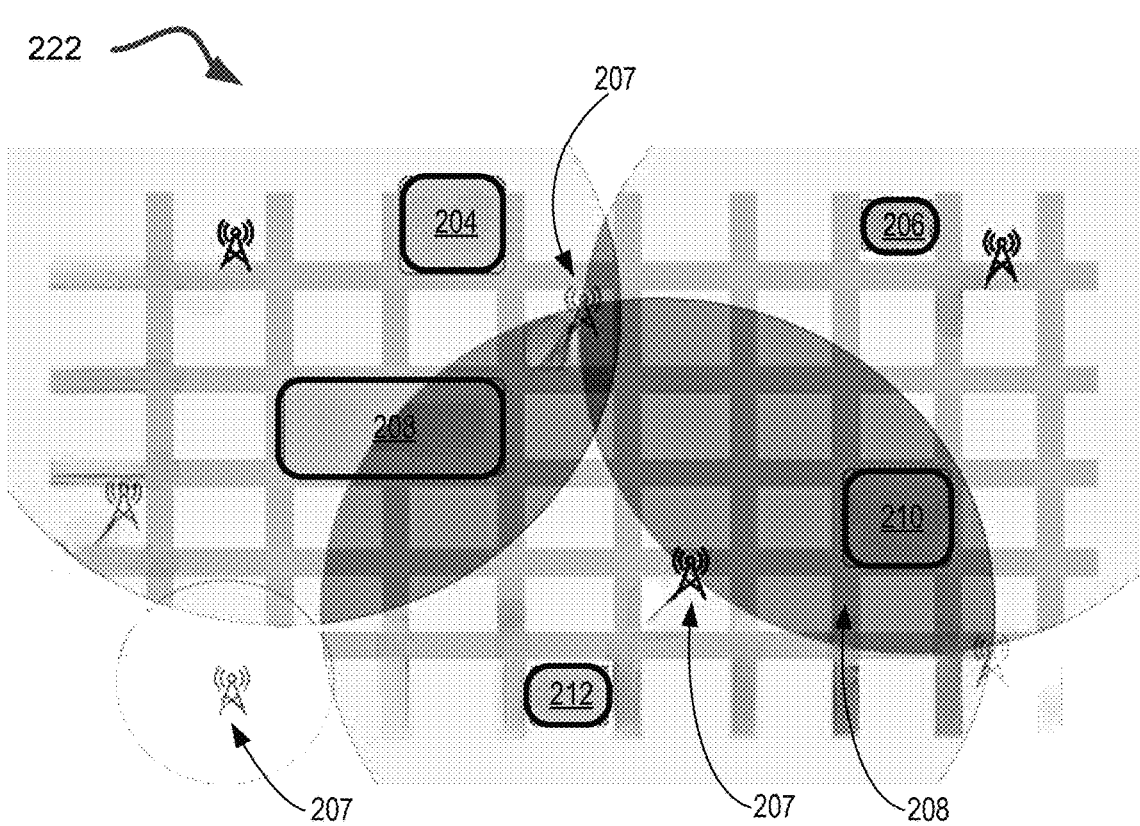
FIG. 2B depicts a schematic diagram of an operating area of a wireless network, in accordance with one or more implementations of the present disclosure.

FIGS. 2A and 2B each show a schematic diagram of an operating area of a wireless network such as RAN 222 that covers and provides service to various locations, in accordance with one or more implementations of the present disclosure. For example, in the depicted implementation, the service area includes multiple RUs 207 whose operative range covers various buildings located between streets 208. In FIG. 2A, all of the RUs 207 are operating at similar operative ranges to cover a business building 204, an emergency services building 206, a transportation junction area 208, a residential building 210, and a health services building 212. In FIG. 2B, however, some of the RUs 207 are not operating, some are operating with a reduced operative range, while others are operating with an increased operative range. As can be seen, in either case, the transportation junction area 208 the residential building 210 are provided the strongest service based on the determination of the presence or movement of individuals at those locations. Analogously, some of the RUs 207 can be set to not be operating or to be operating with a reduced operative range based on the absence of people or vehicles within their respective coverage areas.

In some implementations, to modify the operation of the RAN 222 and change the operation of the RUs 207, the RIC 124 can modify the control parameters based on the data received from one or more of the RUs 207. In these and other implementations, in addition to or alternatively to these remedial measures, the ECS 126 and RAN 122 can process the data and, in response, transmit a corresponding notification or generate a corresponding representation to another device in the architecture 100. For example, (a) the RIC 124 can adjust antenna (i.e., RU 207) operation based on the detected presence or movement of objects and individuals (e.g., by reducing the number of turned on antennas covering areas where people are not present or areas towards which people are not moving) while maintaining service quality, (b) in an emergency, the ECS 126 of the MEC 128 can provide a real-time approximation of how many people are in the target spatial area, or (c) the RAN 122 can detect the presence of individuals 123 in limited lighting conditions or through walls and transmit a notification or generate a graphical rendering 130 of such individuals.

Therefore, in some implementations, a computing device 108, 109, 110, 112, 114, or RIC 124 of architecture 100 can control the RAN 122 via network 101. This can include controlling the RUs 107A, 107B and their constituent antennas with corresponding control parameters. Thus, by controlling the RUs 107A, 107B, a graphical representation of a physical area (e.g., a geographical space, a city, a town, a building, a room, etc.) can be generated (e.g., via a computing device 108, 109, 110, 112, 114). Similarly, a computing device 108, 109, 110, 112, 114, or RIC 124 of architecture 100 can control the ECS 126 via network 101 to analyze and process data obtained from the RUs 107A, 107B. Thus, in some implementations, a computing device 108, 109, 110, 112, 114, RIC 124, ECS 126, or a combination of the foregoing can detect patterns (e.g., where and how individuals, vehicles, and other objects move) in a physical space (e.g., a geographical space, a city, a town, a building, a room, etc.) and detect the presence of animate objects (e.g., people, animals, etc.) and inanimate objects (e.g., vehicles, fixtures, furniture, etc.). In these implementations the detection can be achieved without relying on the presence of UEs in the location or depending on individuals or vehicles to be carrying or incorporating a UE within them. These and other features of the implementations can be better understood with reference to FIGS. 3-6 described below.

Figure 3:
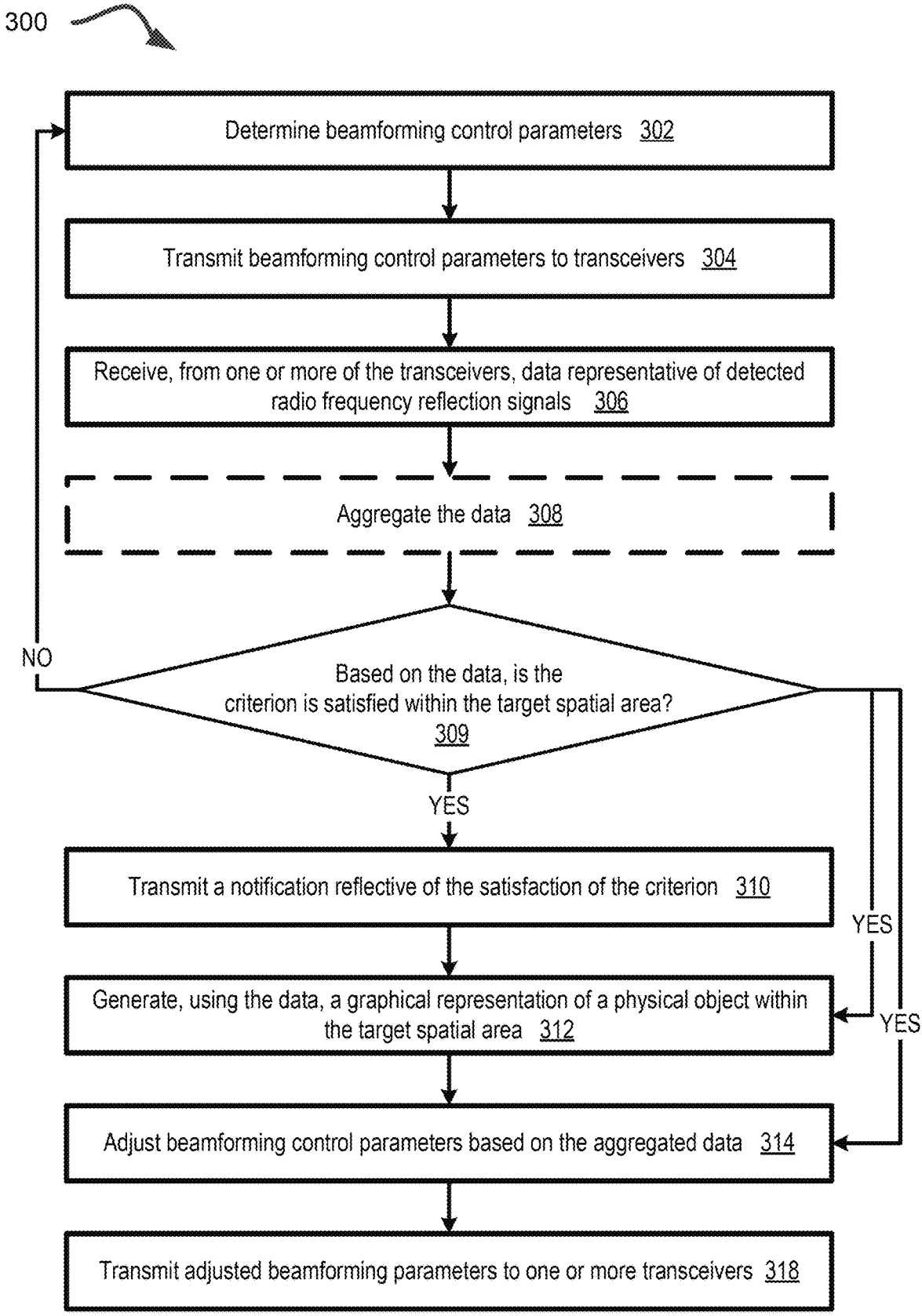
FIG. 3 illustrates a flow diagram of an example method for object and pattern detection, in accordance with one or more implementations of the present disclosure.

The procedure for recognizing objects, people, and/or movement is described with reference to FIG. 3. FIG. 3 depicts a flow diagram of an example method 300 for object and pattern recognition, in accordance with one or more implementations of the present disclosure. Method 300 can be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations can be performed by one or more processors of a computer system (e.g., the computing devices of architecture 100 of FIG. 1, the computer system 500 of FIG. 5, or the computer system 600 of FIG. 6) implementing the method. In an illustrative example, method 300 can be performed by a single processing thread. Alternatively, method 300 can be performed by two or more processing threads, each thread implementing one or more individual functions, routines, subroutines, or operations of the method. In an illustrative example, the processing threads implementing method 300 can be synchronized (e.g., using semaphores, critical sections, or other thread synchronization mechanisms). Alternatively, the processing threads implementing method 300 can be executed asynchronously with respect to each other. Therefore, while FIG. 3 and the associated description lists the operations of method 300 in certain order, various implementations of the method can perform at least some of the described operations in parallel or in arbitrary selected orders. Events and operations occurring within the various blocks of method 300 can occur, in some implementations, in any order as well as together with or instead of events and operations described with reference to the various blocks of method 400 of FIG. 4, or with reference to the various blocks of method 500 of FIG. 5.

In some implementations, at block 302, the processing logic can determine control parameters for the operation of one or more elements of RAN 122 of FIG. 1. For example, the processing logic can determine beamforming control parameters (e.g., based on the capabilities of the beamforming device, the dimensions and landscape of the target spatial area, and the desired object or motion detection function) for the RUs 107B or the transceivers that form part of each of the RUs 107B. In one implementation, the processing logic can, at block 304, transmit beamforming control parameters to one or more components of RAN 122 such as the DUs or RUs 107B, 107A. In these or other implementations, for example, the processing logic can transmit beamforming control parameters to one or more of transceivers (e.g., RUs) to manage the generation and emission of RF beams. Consequently, at block 306, the processing logic can receive from one or more of the transceivers, data representative of detected radio frequency reflection signals. For example, the processing logic can receive digital data that is a converted representation of the analog reflected signals detected and sensed by the RUs.

In the same or other embodiments, the processing logic can, at block 308, aggregate the data based on a set of data aggregation criteria. For example, the processing logic can collect the data in a single storage location, process it to obtain inferences via AI, ML, or other inference operations, or analyze the data to obtain aggregate information from the entire collection of data. In some implementations, the processing logic can use the data to perform training or testing of an ML model or it can use the data to obtain inferences regarding the satisfaction of a criterion or a condition as well as the detection of a pattern. For example, the ML model can include a neural network trained to detect indications of the presence of objects or to detect indications of motion within an input dataset of digital data representative of the analog reflected RF signals. Accordingly, at block 309, the processing log can determine, based on the aggregated data, whether an object detection criterion is satisfied within a target spatial area. For example, the object detection criterion can be defined to be satisfied when the data indicates the presence of an object or an individual within the target spatial area. In some implementations, the object detection criterion can be satisfied if, based on the data, the processing logic determines that the detected number of objects or people exceeds a pre-determined threshold value. Analogously, in other examples, the object detection criterion can be satisfied if, based on the data, the processing logic determines that the detected number of objects or people is below a pre-determined threshold value.

Accordingly, at block 310, the processing logic can, responsive to the determination that the object detection criterion is satisfied, transmit, to one of the computing devices of architecture 100, a notification reflective of the satisfaction of the object detection criterion. In some implementations the notification can simply indicate that the object detection criterion has been satisfied as in the case of a binary encoding corresponding to a true state of the condition in which the object detection criterion is satisfied (e.g., a signal with a logical value of 1 (i.e., true) that triggers a light to turn on) in one of the computing devices of architecture 100. In some implementations, the processing logic can, at block 312, responsive to the determination that the object detection criterion is satisfied, generate, using the data, a graphical representation of a physical object within the target spatial area. For example, in response to determining, based on the aggregated data, that a number of people that exceeds a pre-determined value is present in the target spatial area, the processing logic can transmit or generate a two-dimensional or three-dimensional rendering of the people on an input-output device in the architecture 100 (e.g., by generating a representation 130 on computing device 106)

In the same or other implementations, the processing logic can, at block 309, determine, based on the data (e.g., by comparison with a reference data set), whether a predefined pattern (e.g., a pattern indicative of movement or a change in density both of objects or of people) exists within the data. For example, the aggregate data can include multiple items of data collected over a period of time. The processing logic can analyze the collected data to determine whether within that period of time, the data indicates a predefined pattern representative of movement or a change in object density within the area. Thus, at block 310, in some implementations, the processing logic can, responsive to the determination that the pattern exists, transmit a notification reflective of the detection of the pattern. For example, the processing logic can, responsive to detecting a predefined pattern within the data, transmit to another device in architecture 100, a notification reflective of the detection of the pattern. In some implementations the notification can, at block 310, simply indicate that the pattern has been detected, while in other implementations, the processing logic can, at block 312, responsive to detecting a predefined pattern within the data, generate, using the aggregated data, a graphical representation of the movement corresponding to the pattern within the target spatial area or the change in density corresponding to the pattern within the target spatial area. For example, if a pattern indicative of a threshold density of objects is detected by the processing logic, the processing logic can generate or transmit a heatmap or a video representation of the people or objects moving in the target spatial area.

These determinations of the satisfaction of criteria or detection of patterns can be indicative of a change in conditions for which it can be desirable to modify the operation of the components of the RAN 122 (e.g., the RUs 107A, 107B). Consequently, the processing logic can, at block 314, adjust control parameters for a telecommunication device of RAN 122. For example, based on the aggregated data, the determination that an object detection criterion is satisfied, or the determination that a pattern is detected, the processing logic can, adjust, the beamforming control parameters for one or more transceivers (e.g., for RUs 107A, 107B in their entirety or for particular antenna devices in the respective RUs 107A, 107B).

The adjustment of the parameters can include modifying the parameters (e.g., altering settings, changing values, making and removing selections, etc.) that control the activation or deactivation of the transceivers (e.g., for RUs 107A, 107B in their entirety or for particular antenna devices in the respective RUs 107A, 107B), parameters that control the operative radius of the transceivers (e.g., of the RUs 107A, 107B or of particular antenna devices in the respective RUs 107A, 107B), parameters that control the sensing capabilities of the transceivers (e.g., of the RUs 107A, 107B or of particular antenna devices in the respective RUs 107A, 107B), and parameters that control the direction, strength, frequency, waveforms, duration of the signals or beams emitted by the transceivers (e.g., by the RUs 107A, 107B or by particular antenna devices in the respective RUs 107A, 107B).

Accordingly, in some implementations, at block 318, the processing logic can transmit adjusted parameters to alter the operation of one or more component devices of the RAN 122 (e.g., the RUs 107A, 107B). For example, the processing logic can transmit adjusted beamforming control parameters to one or more transceivers (e.g., to one or more of the RUs 107A, 107B or to particular antenna devices in the respective RUs 107A, 107B). The transmitted adjusted parameters can then cause the RUs 107A, 107B or their constituent antenna components to alter their operation accordingly. These transmissions of parameters, signals, and data can, in some implementations, include the transmission and receipt of information through intermediate computing device. These and other example implementations involving the use of intermediate computing devices such as DUs (e.g., servers 103 of FIG. 1) are described below with reference to FIG. 4.

Figure 4:
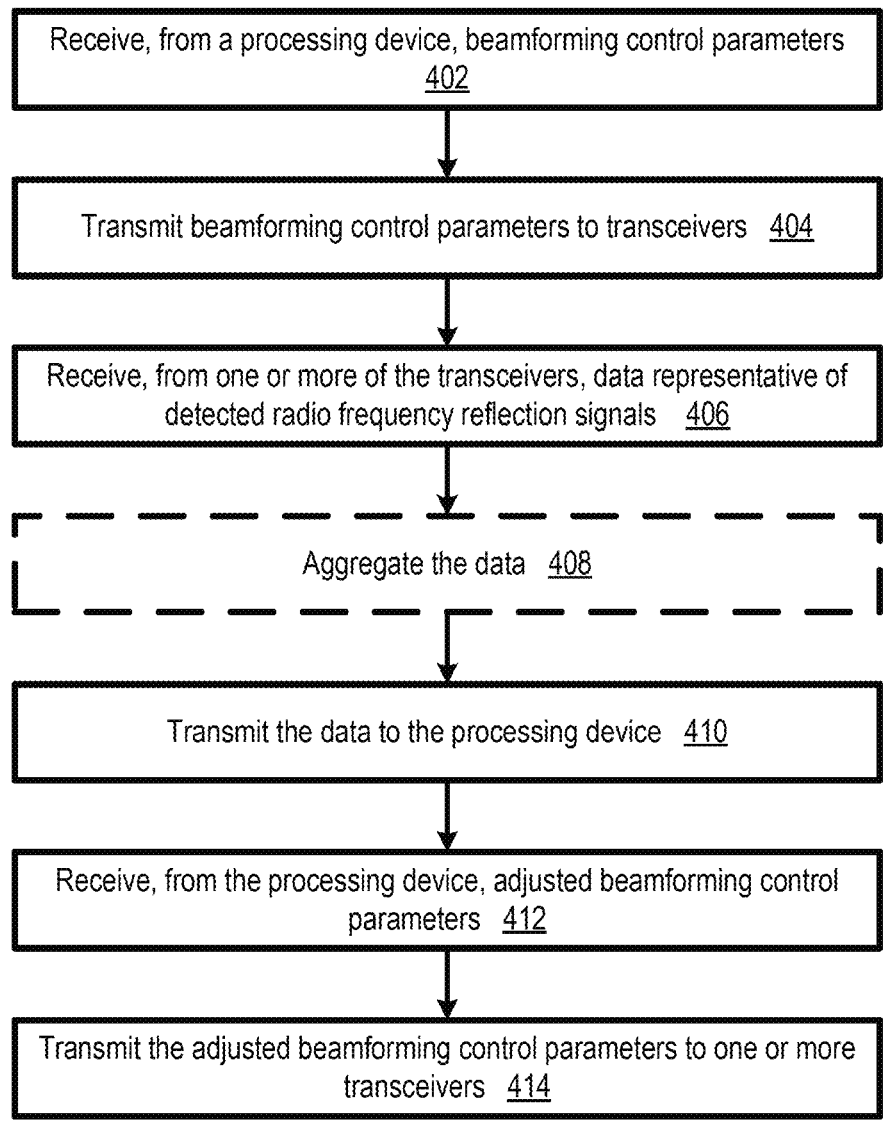
FIG. 4 illustrates a flow diagram of an example method for modifying the operation of a wireless network, in accordance with one or more implementations of the present disclosure.

FIG. 4 illustrates a flow diagram of an example method 400 for modifying the operation of a wireless network, in accordance with one or more implementations of the present disclosure. Method 400 can be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations can be performed by one or more processors of a computer system (e.g., the computing devices of architecture 100 of FIG. 1, the computer system 500 of FIG. 5, or the computer system 600 of FIG. 6) implementing the method. In an illustrative example, method 400 can be performed by a single processing thread. Alternatively, method 400 can be performed by two or more processing threads, each thread implementing one or more individual functions, routines, subroutines, or operations of the method. In an illustrative example, the processing threads implementing method 400 can be synchronized (e.g., using semaphores, critical sections, or other thread synchronization mechanisms). Alternatively, the processing threads implementing method 400 can be executed asynchronously with respect to each other. Therefore, while FIG. 4 and the associated description lists the operations of method 400 in certain order, various implementations of the method can perform at least some of the described operations in parallel or in arbitrary selected orders. Events and operations occurring within the various blocks of method 400 can occur, in some implementations, in any order as well as together with or instead of events and operations described with reference to the various blocks of method 300 of FIG. 3, or with reference to the various blocks of method 500 of FIG. 5.

In some implementations, at block 402, the processing logic can receive (e.g., from a processing device, a virtual device, a computing device) one or more control parameters for the operation of the RAN 122 of FIG. 1. For example, the processing logic can receive, from a processing device (e.g., a DU, a server 103, a RIC 124, an ECS 126, or another virtual device of MEC 128), beamforming control parameters for one or more transceivers (e.g., RUs 107A, 107B).

In these and other implementations, the processing logic can then pass on these parameters to other devices in the RAN 122. For example, the processing logic can, at block 404, transmit beamforming control parameters to one or more components of RAN 122 such as the DUs or RUs 107B, 107A. In these or other implementations, the processing logic can transmit beamforming control parameters to one or more of transceivers (e.g., RUs) to manage the generation and emission of RF beams as well as the sensing of reflections of the emitted beams (i.e., an echo signal or reflection signal, detected by the transceiver(s) at the RUs after incidence with an object).

In some implementations, the processing logic can, at block 406, receive, from one or more transceivers (e.g., from RUs 107A, 107B), data that is representative of detected radio frequency reflection signals. For example, the processing logic can receive digital data that is a converted representation of the analog reflected signals detected and sensed by the RUs. In some implementations, the processing logic can receive from one or more RUs a continuous digital data stream of converted RF reflections sensed by the RUs.

Further, in the various implementations, the processing logic can, at block 408, aggregate the data based on a set of data aggregation criteria. For example, the processing logic can aggregate the digital data items received from each of the one or more RUs as they transmit the converted echo signals from analog to digital format. The processing logic can collect the data in a single storage location and can analyze the data to obtain aggregate information from the entire collection of data. In some implementations, the processing logic can, at block 410, transmit the aggregated data to a processing device. For example, while in some cases the processing logic can transmit the aggregated data automatically without being requested or prompted to do so, in other cases, responsive to receiving a request from the processing device, the processing logic can transmit the aggregated data to the processing device or to another device. In some implementations, the processing logic can transmit the data (e.g., in aggregated form or as individual data items) to other physical or virtual devices in the RAN 122 or the MEC 128 such as to the RIC 124 or the ECS 126.

Consequently, the processing logic can, at block 412, receive adjusted control parameters for modifying the operation of one or more components (e.g., telecommunication devices) of RAN 122. For example, the processing logic can receive, from a processing device (e.g., an ECS 126 on which a virtual RIC 124 is running), adjusted beamforming control parameters for one or more transceivers (e.g., for RUs 107A, 107B in their entirety or for particular antenna devices in the respective RUs 107A, 107B). The adjusted parameters can include parameters that control the activation or deactivation of the transceivers (e.g., for RUs 107A, 107B in their entirety or for particular antenna devices in the respective RUs 107A, 107B), parameters that control the operative radius of the transceivers (e.g., of the RUs 107A, 107B or of particular antenna devices in the respective RUs 107A, 107B), parameters that control the sensing capabilities of the transceivers (e.g., of the RUs 107A, 107B or of particular antenna devices in the respective RUs 107A, 107B), and parameters that control the direction, strength, frequency, waveforms, duration of the signals or beams emitted by the transceivers (e.g., by the RUs 107A, 107B or by particular antenna devices in the respective RUs 107A, 107B).

In these or other implementations, at block 414, the processing logic can transmit adjusted parameters to alter the operation of one or more component devices of the RAN 122 (e.g., the RUs 107A, 107B). For example, the processing logic can transmit adjusted beamforming control parameters to one or more transceivers (e.g., to one or more of the RUs 107A, 107B or to particular antenna devices in the respective RUs 107A, 107B). The transmitted adjusted parameters can then cause the transceivers such as the RUs 107A, 107B or their constituent antenna components to modify their operation accordingly. In the various implementations, these transmissions of parameters, signals, and data can begin and end with transceivers such as antenna devices and RUs 107A, 107B. These and other example implementations are described below with reference to FIG. 5 detailing the operation and functions of such devices.

Figure 5:
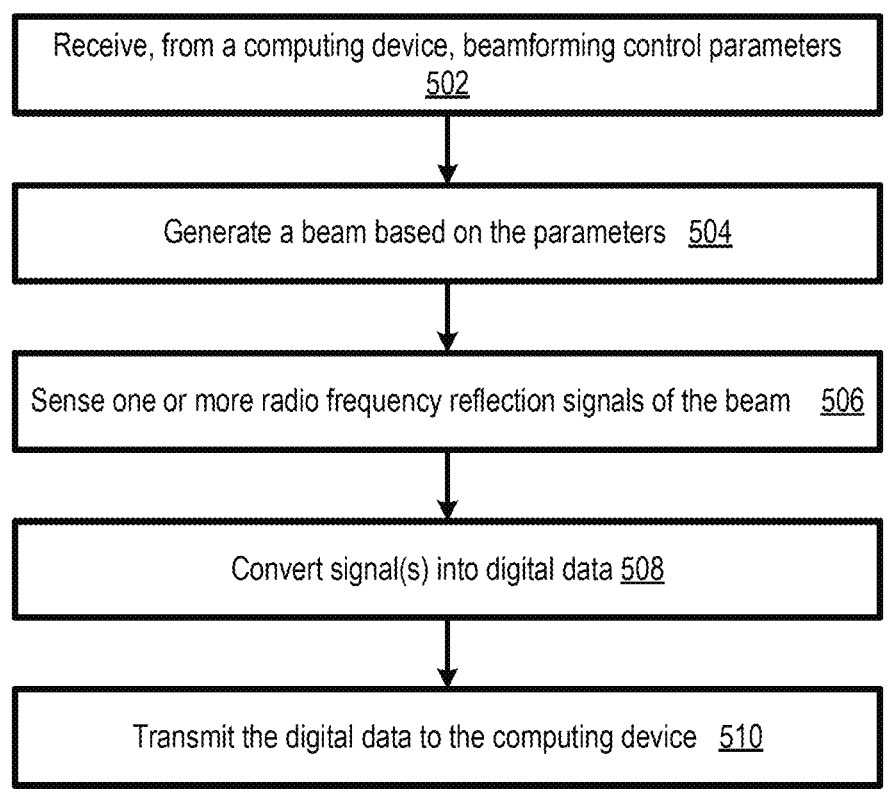
FIG. 5 illustrates a flow diagram of an example method for obtaining data for object and pattern detection, in accordance with one or more implementations of the present disclosure.

FIG. 5 illustrates a flow diagram of an example method 500 for obtaining data for object and pattern detection, in accordance with one or more implementations of the present disclosure. Method 500 can be performed by processing logic that includes hardware (e.g., circuitry, dedicated logic, programmable logic, microcode, etc.), software (e.g., instructions run on a processor to perform hardware simulation), or a combination thereof. Method 500 or each of its individual functions, routines, subroutines, or operations can be performed by one or more processors of a computer system (e.g., the computing devices of architecture 100 of FIG. 1, the computer system 500 of FIG. 5, or the computer system 600 of FIG. 6) implementing the method. In an illustrative example, method 500 can be performed by a single processing thread. Alternatively, method 500 can be performed by two or more processing threads, each thread implementing one or more individual functions, routines, subroutines, or operations of the method. In an illustrative example, the processing threads implementing method 500 can be synchronized (e.g., using semaphores, critical sections, or other thread synchronization mechanisms). Alternatively, the processing threads implementing method 500 can be executed asynchronously with respect to each other. Therefore, while FIG. 5 and the associated description lists the operations of method 500 in certain order, various implementations of the method can perform at least some of the described operations in parallel or in arbitrary selected orders. Events and operations occurring within the various blocks of method 500 can occur, in some implementations, in any order as well as together with or instead of events and operations described with reference to the various blocks of method 300 of FIG. 3, or with reference to the various blocks of method 400 of FIG. 4.

In some implementations, at block 502, the processing logic can receive control parameters from another device of the RAN 122 or the MEC 128 of FIG. 1. For example, the processing logic can receive, from a computing device (e.g., DU, server 103, RIC 124, ECS 126, etc.), beamforming control parameters. In these or other implementation, the processing logic can, at block 504, generate a beam based on the parameters. For example, the processing logic can emit an RF beam defined by the parameters that control the operative radius of the transceivers (e.g., of the RUs 107A, 107B or of particular antenna devices in the respective RUs 107A, 107B), parameters that control the sensing capabilities of the transceivers (e.g., of the RUs 107A, 107B or of particular antenna devices in the respective RUs 107A, 107B), and parameters that control the direction, strength, frequency, waveforms, duration of the signals or beams emitted by the transceivers (e.g., by the RUs 107A, 107B or by particular antenna devices in the respective RUs 107A, 107B).

Further, the processing logic, at block 506, can detect one or more of the reflected echoes of the emitted beam. For example, the processing logic can detect and sense one or more radio frequency reflection signals of the beam. Accordingly, at block 508, the processing logic can convert signal(s) into digital format. For example, the processing logic can convert the detected analog reflection signal into discrete items of digital data and can also combine the discrete items of digital data into a continuous digital data stream.

Consequently, the processing logic can, at block 510, transmit the digital data to another device on the RAN 122 or MEC 128. For example, the processing logic can transmit the digital data to a computing device such as server 103, RIC 124, or ECS 126. This data can then be processed and analyzed to perform a remedial action (e.g., generate and transmit a notification) or to generate and provide an audio, visual, or audiovisual representation of the detected objects, people, or motion.

FIG. 6 depicts a block diagram of a computer system 600 operating in accordance with one or more aspects of the present disclosure. Computer system 600 may be the same or similar to the computing devices or processing devices in architecture 100 of FIG. 1, and may include one or more processing devices 602 (e.g., processors) and one or more memory devices. In the example shown, computer system 600 may include a parameter module 610, a data conversion module 615, a communication module 620, and a data processing module 630, as well as a memory 604. The memory may include parameter data 605, signal data 607, and graphical data 609.

The parameter module 610 may enable the processing device 602 to generate, transmit, or receive parameters for operating one or more devices on the RAN 122 of FIG. 1. For example, the parameter module 610 can enable the processing device to generate, modify, transmit or receive the parameter data 605. The data conversion module 615 may enable the processor to convert or encode analog RF signals or beam reflections into digital format or to extrapolate visual data from such digital encodings. For example, the data conversion module 615 can enable the processing device to convert the signal data 607 from analog format to digital format.

The communication module 620 may enable the processing device 602 to transmit information (e.g., parameter data 605, signal data 607, and/or graphical data 609) to and receive information from one or more devices on the RAN 122 or MEC 128 depending on the medium of communication and in accordance with the communication protocols governing the communication. Data processing module 630 can enable the processing device 602 to aggregate, process, analyze, and manipulate the data (e.g., for AI and ML training and/or inference operations) as well as for generating audio, visual, or graphical representations based on aggregated data.

FIG. 7 depicts a block diagram of a computer system operating in accordance with one or more aspects of the disclosure. In various illustrative examples, computer system 600 may correspond to computing devices or processing devices in architecture 100 of FIG. 1. In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 718, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720. Data storage device 716 may include a non-transitory computer-readable storage medium 724 on which may store instructions 726 encoding any one or more of the methods or functions described herein (e.g., methods 300, 400, 500 of FIGS. 3, 4, and 5, respectively), including instructions for implementing the RAN 122, RIC 124, ECS, 126 of FIG. 1. Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method including: determining beamforming control parameters for a plurality transceivers; transmitting, by a processing device, the beamforming control parameters to the plurality of transceivers; receiving, from one or more of the transceivers, data representative of detected radio frequency reflection signals; determining, based on the data, whether an object detection criterion is satisfied within a target spatial area; responsive to the determination that the object detection criterion is satisfied, transmitting a notification reflective of the object detection criterion being satisfied; adjusting, based on the data, the beamforming control parameters; and transmitting adjusted beamforming control parameters to one or more transceivers of the plurality of transceivers.

Example 2 is the method of example 1, further including responsive to determining that the object detection criterion is satisfied, generating, using the data, a graphical representation of a physical object within the target spatial area.

Example 3 is the method of example 1, further including responsive to detecting a predefined pattern within the data, transmitting a notification reflective of the detection of the pattern.

Example 4 is the method of example 1, further including responsive to detecting a predefined pattern within the data, generating, using the data, a graphical representation of movement corresponding to the pattern.

Example 5 is the method of example 1, further including aggregating the data based on a set of data aggregation criteria.

Example 6 is the method of example 1, wherein the plurality of transceivers comprises a plurality of transceiver sets, wherein each transceiver set forms a part of a respective radio unit (RU).

Example 7 is the method of example 1, wherein the processing device comprises a radio access intelligent controller (RIC).

Example 8 is a system including a memory; a processing device coupled to the memory, the processing device configured to determine beamforming control parameters for a plurality transceivers; transmit the beamforming control parameters to a plurality of transceivers; receive, from one or more of the transceivers, data representative of detected radio frequency reflection signals; determine, based on the data, whether an object detection criterion is satisfied within a target spatial area; responsive to the determination that the object detection criterion is satisfied, transmit a notification reflective of the object detection criterion being satisfied; adjust, based on the data, the beamforming control parameters; and transmit adjusted beamforming control parameters to one or more transceivers of the plurality of transceivers.

Example 9 is the system of example 8, wherein the processing device is further configured to: responsive to determining that the object detection criterion is satisfied, generate, using the data, a graphical representation of a physical object within the target spatial area.

Example 10 is the system of example 8, wherein the processing device is further configured to responsive to detecting a predefined pattern within the data, transmit a notification reflective of the detection of the pattern.

Example 11 is the system of example 10, wherein the processing device is further configured to responsive to detecting a predefined pattern within the data, generate, using the data, a graphical representation of movement corresponding to the pattern.

Example 12 is the system of example 10, wherein the processing device is further configured to aggregate the data based on a set of data aggregation criteria.

Example 13 is the system of example 8, wherein the plurality of transceivers comprises a plurality of transceiver sets, wherein each transceiver set forms a part of a respective radio unit (RU).

Example 14 is the system of example 8, wherein the processing device comprises a radio access intelligent controller (RIC).

Example 15 is a non-transitory machine-readable storage medium including instructions that, when accessed by a processing device, cause the processing device to determine beamforming control parameters for a plurality of transceivers; transmit the beamforming control parameters to the plurality of transceivers; receive, from one or more of the transceivers, data representative of detected radio frequency reflection signals; determine, based on the data, whether an object detection criterion is satisfied within a target spatial area; responsive to the determination that the object detection criterion is satisfied, transmit a notification reflective of the object detection criterion being satisfied; adjust, based on the data, the beamforming control parameters; and transmit adjusted beamforming control parameters to one or more transceivers of the plurality of transceivers.

Example 16 is the non-transitory machine-readable storage medium of example 15, wherein the instructions further cause the processing device to: responsive to determining that the object detection criterion is satisfied, generate, using the data, a graphical representation of a physical object within the target spatial area.

Example 17 is the non-transitory machine-readable storage medium of example 15, wherein the instructions further cause the processing device to responsive to detecting a predefined pattern within the data, transmit a notification reflective of the detection of the pattern.

Example 18 is the non-transitory machine-readable storage medium of example 15, wherein the instructions further cause the processing device to responsive to detecting a predefined pattern within the data, generate, using the data, a graphical representation of movement corresponding to the pattern.

Example 19 is the non-transitory machine-readable storage medium of example 15, wherein the instructions further cause the processing device to aggregate the data based on a set of data aggregation criteria.

Example 20 is the non-transitory machine-readable storage medium of example 15, wherein the plurality of transceivers comprises a plurality of transceiver sets, wherein each transceiver set forms a part of a respective radio unit (RU), and wherein the processing device comprises a radio access intelligent controller (RIC).

Example 21 is a method including: receiving, from a processing device, beamforming control parameters; transmitting the beamforming control parameters to multiple transceivers; receiving, from one or more of the transceivers, data representative of detected radio frequency reflection signals; responsive to receiving a request from the processing device, transmit the data to the processing device; receiving, from the processing device, adjusted beamforming control parameters; and transmitting the adjusted beamforming control parameters to one or more transceivers of the multiple transceivers.

Example 22 is the method of example 21 further including aggregating the data.

Example 23 is the method of example 21 wherein each transceiver comprises a radio unit (RU) and the processing device comprises a radio access intelligent controller (RIC).

Example 24 is a system including a memory; a first processing device coupled to the memory, the first processing device configured to receive, from a second processing device, beamforming control parameters; transmit beamforming control parameters to a plurality of transceivers; receive, from one or more of the transceivers, data representative of detected radio frequency reflection signals; responsive to receiving a request from the second processing device, transmit the data to the second processing device; receive, from the processing device, adjusted beamforming control parameters; and transmit the adjusted beamforming control parameters to one or more transceivers of the plurality of transceivers.

Example 25 is the system of example 21 wherein the first processing device is further configured to aggregate the data.

Example 26 is the method of example 21 wherein each transceiver comprises a radio unit (RU) and the processing device comprises a radio access intelligent controller (RIC).

Example 27 is the non-transitory machine-readable storage medium including instructions that, when accessed by a processing device, cause the processing device to receive, from a second processing device, beamforming control parameters; transmit beamforming control parameters to a plurality of transceivers; receive, from one or more of the transceivers, data representative of detected radio frequency reflection signals; responsive to receiving a request from the second processing device, transmit the data to the second processing device; receive, from the processing device, adjusted beamforming control parameters; and transmit the adjusted beamforming control parameters to one or more transceivers of the plurality of transceivers.

Example 28 is the non-transitory machine-readable storage medium of example 27 including instructions that, when accessed by a processing device, further cause the processing device to aggregate the data.

Example 29 is the non-transitory machine-readable storage medium of example 27 wherein each transceiver comprises a radio unit (RU) and the processing device comprises a radio access intelligent controller (RIC).

Example 30 is a method including receiving, from a computing device, beamforming control parameters; emitting a beam based on the parameters; sensing one or more radio frequency reflection signals of the beam; converting the one or more radio frequency reflection signals into a digital format to generate digital data; and transmitting the digital data to the computing device.

Example 31 is the method of example 30 wherein converting the one or more radio frequency reflection signals into a digital format includes converting the one or more radio frequency reflection signals into a digital data stream.

Example 32 is the method of example 30 wherein the beam is a millimeter wave (mmWave) radio frequency beam and the computing device is a distributed unit (DU).

Example 33 is a system including a memory; a first processing device coupled to the memory, the first processing device configured to receive, from a computing device, beamforming control parameters; emit a beam based on the parameters; sense one or more radio frequency reflection signals of the beam; convert the one or more radio frequency reflection signals into a digital format to generate digital data; and transmit the digital data to the computing device.

Example 34 is the system of example 33 wherein converting the one or more radio frequency reflection signals into a digital format includes converting the one or more radio frequency reflection signals into a digital data stream.

Example 35 is the method of example 33 wherein the beam is a millimeter wave (mmWave) radio frequency beam and the computing device is a distributed unit (DU).

Example 36 is the non-transitory machine-readable storage medium including instructions that, when accessed by a processing device, cause the processing device to receive, from a computing device, beamforming control parameters; emit a beam based on the parameters; sense one or more radio frequency reflection signals of the beam; convert the one or more radio frequency reflection signals into a digital format to generate digital data; and transmit the digital data to the computing device.

Example 37 is the non-transitory machine-readable storage medium of example 36 wherein converting the one or more radio frequency reflection signals into a digital format includes converting the one or more radio frequency reflection signals into a digital data stream.

Example 37 is the non-transitory machine-readable storage medium of example 36 wherein the beam is a millimeter wave (mmWave) radio frequency beam and the computing device is a distributed unit (DU).

Example 38 is the method of any of examples 1, 21, or 30 wherein the beamforming parameters comprise parameters that manage the operation of a 5G base station (BS).

Example 39 is the system of any of examples 8, 24, or 33 wherein the beamforming parameters comprise parameters that manage the operation of a 5G base station (BS).

Example 40 is the non-transitory machine-readable storage medium of any of examples 15, 27, or 36 wherein the beamforming parameters comprise parameters that manage the operation of a 5G base station (BS).

Example 41 is the method of any of examples 1, 21, or 30 wherein the reflections signals are millimeter wave (mmWave) radio frequency signals.

Example 42 is the system of any of examples 8, 24, or 33 wherein the reflections signals are millimeter wave (mmWave) radio frequency signals).

Example 43 is the non-transitory machine-readable storage medium of any of examples 15, 27, or 36 wherein the reflections signals are millimeter wave (mmWave) radio frequency signals.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner. In certain implementations, not all operations or sub-operations of the methods herein are required to be performed.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "identifying," "displaying," "obtaining," "creating," "generating," "mapping," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
    determining beamforming control parameters for a plurality of transceivers;
    transmitting, by a processing device, the beamforming control parameters to the plurality of transceivers;
    receiving, from one or more transceivers of the plurality of transceivers, data representative of detected radio frequency reflection signals;
    determining, based on the data, whether an object detection criterion is satisfied within a target spatial area; and
    responsive to a determination that the object detection criterion is satisfied:
        transmitting a notification reflective of the object detection criterion being satisfied;
        adjusting, based on the data, the beamforming control parameters; and
        transmitting the adjusted beamforming control parameters to the one or more transceivers of the plurality of transceivers.

2. The method of claim 1, further comprising:
    responsive to the determination that the object detection criterion is satisfied, generating, using the data, a graphical representation of a physical object within the target spatial area.

3. The method of claim 1, further comprising:
    responsive to detecting a predefined pattern within the data, transmitting a notification reflective of the detection of the predefined pattern.

4. The method of claim 1, further comprising:
    responsive to detecting a predefined pattern within the data, generating, using the data, a graphical representation of movement corresponding to the predefined pattern.

5. The method of claim 1, further comprising:
    aggregating the data based on a set of data aggregation criteria.

6. The method of claim 1, wherein the plurality of transceivers comprises a plurality of transceiver sets, and wherein each transceiver set in the plurality of transceiver sets forms a part of a respective radio unit (RU).

7. The method of claim 1, wherein the processing device comprises a radio access intelligent controller (RIC).

8. A system comprising:
    a memory; and
    a processing device coupled to the memory, the processing device to:
        determine beamforming control parameters for a plurality of transceivers;
        transmit the beamforming control parameters to the plurality of transceivers;
        receive, from one or more transceivers of the plurality of transceivers, data representative of detected radio frequency reflection signals;
        determine, based on the data, whether an object detection criterion is satisfied within a target spatial area; and
        responsive to a determination that the object detection criterion is satisfied:
            transmit a notification reflective of the object detection criterion being satisfied;
            adjust, based on the data, the beamforming control parameters; and
            transmit the adjusted beamforming control parameters to the one or more transceivers of the plurality of transceivers.

9. The system of claim 8, wherein the processing device is further to:
    responsive to the determination that the object detection criterion is satisfied, generate, using the data, a graphical representation of a physical object within the target spatial area.

10. The system of claim 8, wherein the processing device is further to:
    responsive to a detection of a predefined pattern within the data, transmit a notification reflective of the detection of the predefined pattern.

11. The system of claim 8, wherein the processing device is further to:
    responsive to a detection of a predefined pattern within the data, generate, using the data, a graphical representation of movement corresponding to the predefined pattern.

12. The system of claim 8, wherein the processing device is further to:
    aggregate the data based on a set of data aggregation criteria.

13. The system of claim 8, wherein the plurality of transceivers comprises a plurality of transceiver sets, and wherein each transceiver set in the plurality of transceiver sets forms a part of a respective radio unit (RU).

14. The system of claim 8, wherein the processing device comprises a radio access intelligent controller (RIC).

15. A non-transitory machine-readable storage medium including instructions that, when accessed by a processing device, cause the processing device to:
    determine beamforming control parameters for a plurality of transceivers;
    transmit, by the processing device, the beamforming control parameters to the plurality of transceivers;
    receive, from one or more transceivers of the plurality of transceivers, data representative of detected radio frequency reflection signals;
    determine, based on the data, whether an object detection criterion is satisfied within a target spatial area; and
    responsive to a determination that the object detection criterion is satisfied:
        transmit a notification reflective of the object detection criterion being satisfied;
        adjust, based on the data, the beamforming control parameters; and
        transmit the adjusted beamforming control parameters to the one or more transceivers of the plurality of transceivers.

16. The non-transitory machine-readable storage medium of claim 15, wherein the instructions, when accessed by the processing device, further cause the processing device to:
    responsive to the determination that the object detection criterion is satisfied, generate, using the data, a graphical representation of a physical object within the target spatial area.

17. The non-transitory machine-readable storage medium of claim 15, wherein the instructions, when accessed by the processing device, further cause the processing device to:

responsive to a detection of a predefined pattern within the data, transmit a notification reflective of the detection of the predefined pattern.

18. The non-transitory machine-readable storage medium of claim 15, wherein the instructions, when accessed by the processing device, further cause the processing device to:
responsive to a detection of a predefined pattern within the data, generate, using the data, a graphical representation of movement corresponding to the predefined pattern.

19. The non-transitory machine-readable storage medium of claim 15, wherein the instructions, when accessed by the processing device, further cause the processing device to:
aggregate the data based on a set of data aggregation criteria.

20. The non-transitory machine-readable storage medium of claim 15, wherein the plurality of transceivers comprises a plurality of transceiver sets, wherein each transceiver set in the plurality of transceiver sets forms a part of a respective radio unit (RU), and wherein the processing device comprises a radio access intelligent controller (RIC).

* * * * *